(12) United States Patent
Crump

(10) Patent No.: US 8,887,765 B2
(45) Date of Patent: Nov. 18, 2014

(54) SPIRAL FLUID FLOW SYSTEM

(76) Inventor: J. Mark Crump, Elburn, IL (US)

( * ) Notice: Subject to any disclaimer, the term of this patent is extended or adjusted under 35 U.S.C. 154(b) by 504 days.

(21) Appl. No.: 13/325,853

(22) Filed: Dec. 14, 2011

(65) Prior Publication Data

US 2013/0153034 A1    Jun. 20, 2013

(51) Int. Cl.
*F15D 1/00* (2006.01)
(52) U.S. Cl.
USPC .............................. 137/810; 137/812; 137/592
(58) Field of Classification Search
CPC . F15D 1/0015; F28D 2020/0069; F15C 1/16; F15C 1/00; F15C 1/02
USPC .......... 137/808, 809, 810, 811, 812, 590, 592
See application file for complete search history.

(56) References Cited

U.S. PATENT DOCUMENTS

| | | | | |
|---|---|---|---|---|
| 1,662,614 A | * | 3/1928 | Mandolini | 137/588 |
| 2,771,944 A | * | 11/1956 | Thornburg | 137/565.17 |
| 4,146,087 A | * | 3/1979 | Johansson | 165/132 |
| 4,294,310 A | * | 10/1981 | Reusch et al. | 165/104.13 |
| 4,765,891 A | | 8/1988 | Wyness | |
| 5,735,600 A | | 4/1998 | Wyness et al. | |
| 6,536,468 B1 | * | 3/2003 | Wilmer et al. | 137/544 |
| 8,381,770 B2 | * | 2/2013 | Schroeder | 137/808 |

* cited by examiner

*Primary Examiner* — Craig Schneider
(74) *Attorney, Agent, or Firm* — Fitch, Even, Tabin & Flannery, LLP

(57) ABSTRACT

A fluid flow system is provided. The system includes a tank, a first manifold and a second manifold. The tank has a generally centralized portion and a sidewall. The tank extends from a lower portion to an upper portion to contain fluid therein. The first manifold is located adjacent the sidewall and has a first length extending from the lower portion to the upper portion. The first manifold defines at least in part a first opening extending along at least a portion of the first length permitting fluid flow therethrough. The first manifold is positioned to permit fluid to flow between the first manifold and the sidewall independent of the first opening. The second manifold is located about the centralized portion and has a second length extending from the lower portion to the upper portion. The second manifold defines a second opening extending along at least a portion of the second length permitting fluid flow therethrough.

20 Claims, 10 Drawing Sheets

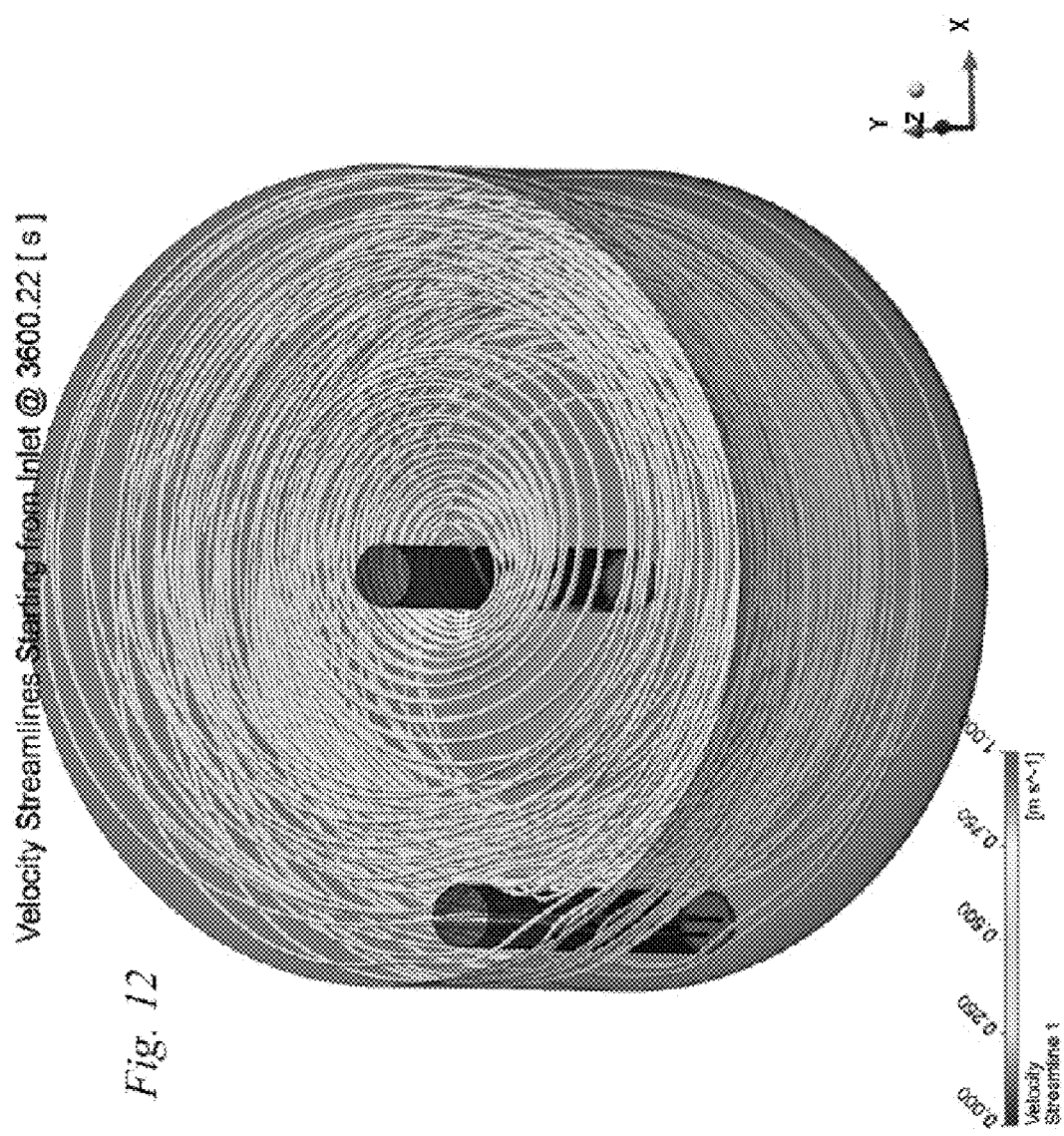

SPIRAL FLUID FLOW SYSTEM

FIELD

A spiral fluid flow system is contemplated. More particularly, the system provides a spiral fluid flow pattern in tanks.

BACKGROUND

Tanks are used for a variety of purposes, including, but not limited to, storage vessels, reaction vessels and the like. Tanks designed to store treated potable water before sending the water to the distribution system are known as clear wells. Such tanks may be rectangular or circular in shape and generally have sufficient volume to retain water for a desired period, such as 30 minutes, to permit disinfection or other treatment of the water. Since the flow patterns through many tanks are not ideal, the tanks are designed with surplus volume to assure that all of the flow is retained for the desired time period. The geometry of the tank is used to help calculate what factor must be applied to determine the actual volume required to achieve the desired results. In this regard, based on the tank geometry, the total volume of the tank may end up being a factor of 2 or 3 times the ideal volume.

Tanks may also take a variety of forms and shapes. Circular tanks are very attractive from a construction cost standpoint since they generally can be built for much less than rectangular tanks. However, circular tanks do not have a convenient flow pattern, such as would be the case for a plug flow configuration found in a pipe. Prior attempts have used concentric tanks nested within the outer tank to help create multiple channels with a flow pattern that was more in keeping with the plug flow concept. However, the cost of this approach was too high in comparison to the cost for rectangular tanks.

Further, other flow patterns have been attempted. For example, a multiple pass design tank 10, such as shown in FIG. 1, uses long, straight baffles 12 to achieve results similar to plug flow. In this regard, the baffles 12 are parallel to each other dividing the tank 10 into long strips of different lengths which cause the fluid to make multiple passes across the tank, as illustrated by arrows 14.

Another approach has been attempted to build a spiral or "snake" baffle, such as shown in FIG. 2. In this form, the tank 16 includes a spiral or snake shaped baffle 18, which is positioned in the tank 16 causing the fluid to flow in a generally spiral manner in the tank 16 as shown by arrows 20. The flow can go from the periphery to the center or vice versa. However, such baffled designs are relatively expensive to construct.

As shown in FIG. 3, a further design attempt at spiral flow is illustrated. A tank 22 includes an inlet 24 and an inlet baffle 26 at a sidewall 28 of the tank 22. An opening 30 is created between the inlet baffle 26 and sidewall 28, which takes all of the incoming flow and directs the flow along the wall 28 in a vertical plane, beginning a spiral pattern. However, as the fluid flows along the sidewall 28, it eventually returns to the baffle 26, which disrupts the fluid flow, as shown by arrows 32. Once past the baffle 26, the fluid will flow in a generally spiral manner, as shown by arrows 34 to an outlet 36.

The baffle 26 may include a hinge 38 at one edge to permit the other edge of the baffle 26 to swing away from the sidewall 28. An adjusting mechanism (not shown) can increase or decrease the opening 30 of the baffle 26 into the tank 22 to maintain a consistent exit velocity based on a varying flow rate to the tank 22.

However, several shortcomings exist with this design. The inlet 24, especially on larger tanks, usually results in the inlet baffle 26 being a significant structure. Further, the inlet baffle 26 undesirably disturbs the spiral flow pattern, as shown at arrows 32. This disruption may have a negative impact on the residency time of the fluid in the tank such that the tank volume is not used efficiently. Further, some tank construction methods require building the cover or roof of the tank at the same time the walls are built. This may present a further problem as the baffle 26 is generally installed after the sidewalls are built and usually require one or more cranes for installation.

A further shortcoming with the design is that the inlet baffle 26 must be connected to the sidewall 28. Some tanks are designed to have a sidewall that will flex or tilt inwardly and outwardly with a change in the liquid level in the tank. Thus, the baffle also must be designed to be flexible to allow this movement without placing additional stress on the tank wall.

BRIEF DESCRIPTION OF THE DRAWINGS

FIG. 12 is a velocity streamline plot showing flow through one exemplary system.

DETAILED DESCRIPTION

Figure 1:
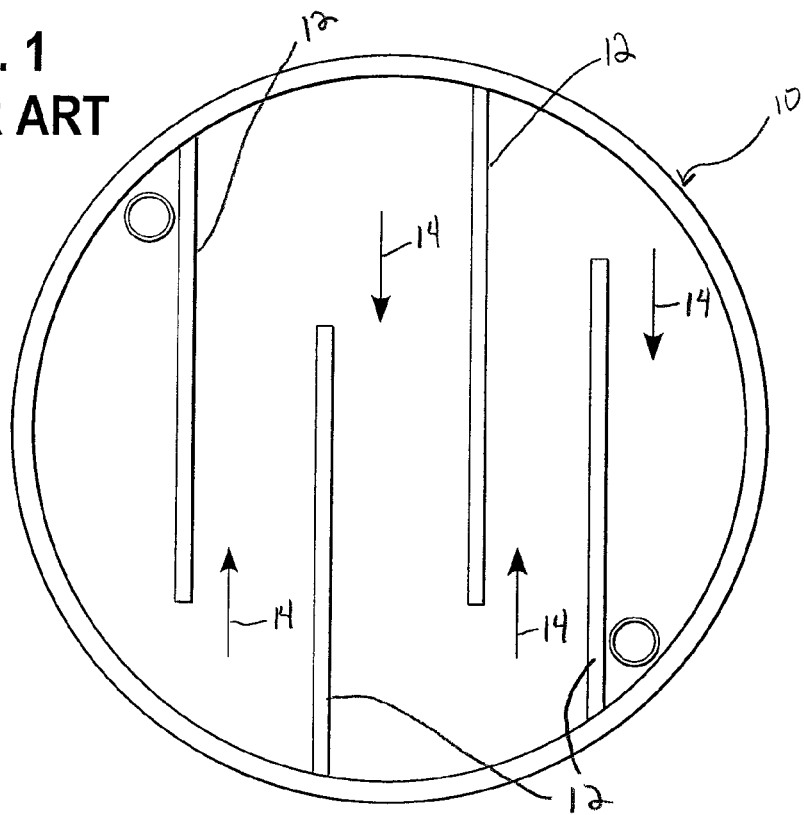
FIG. 1 is a top view of a prior art multi-pass tank illustrating a fluid flow profile therein.
Figure 2:
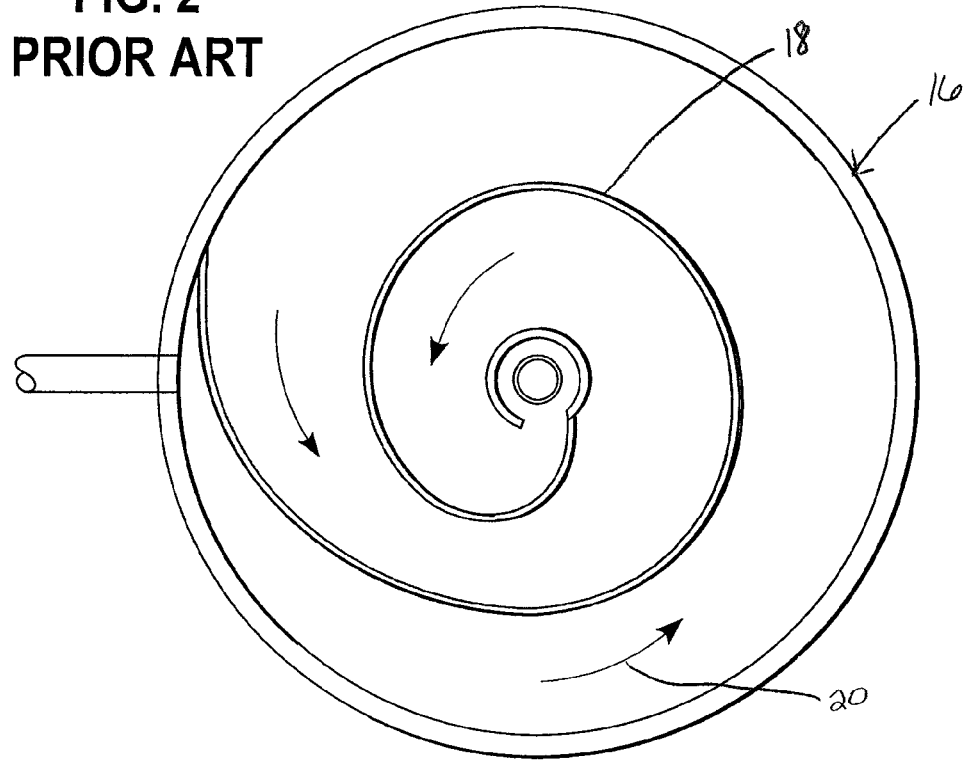
FIG. 2 is a top view of a prior art snail flow tank illustrating a fluid flow profile therein.
Figure 3:
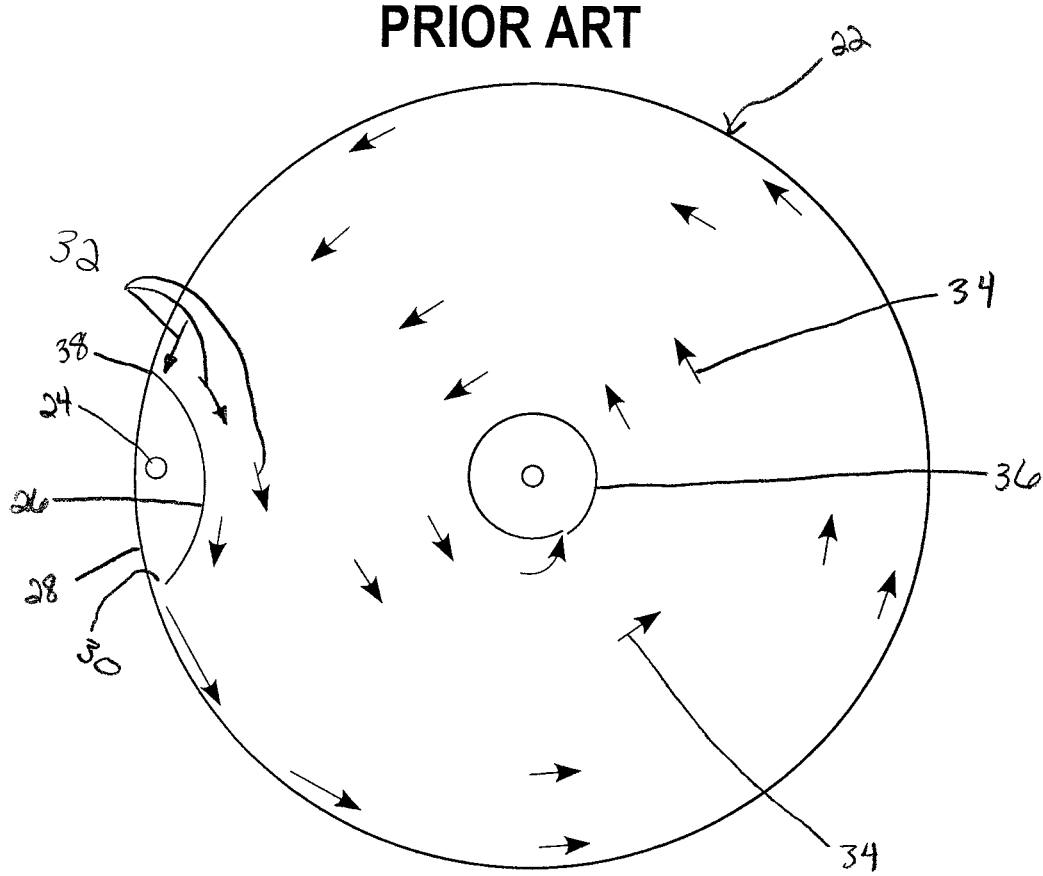
FIG. 3 is a top view of a prior art spiral flow tank illustrating a fluid flow profile therein.
Figure 4:
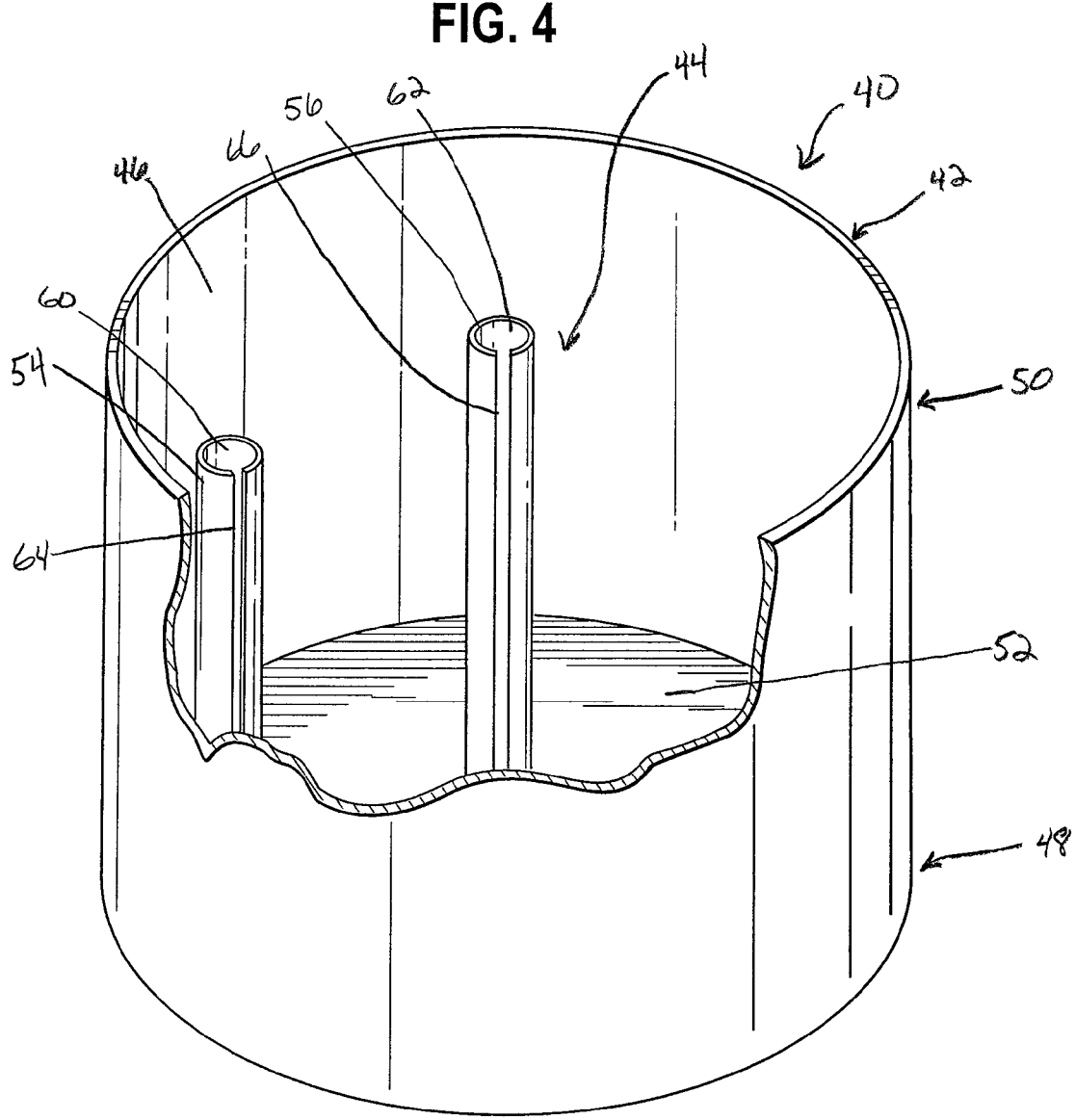
FIG. 4 is a perspective view of one form of a spiral flow system with a portion of a sidewall cutaway.
Figure 5:
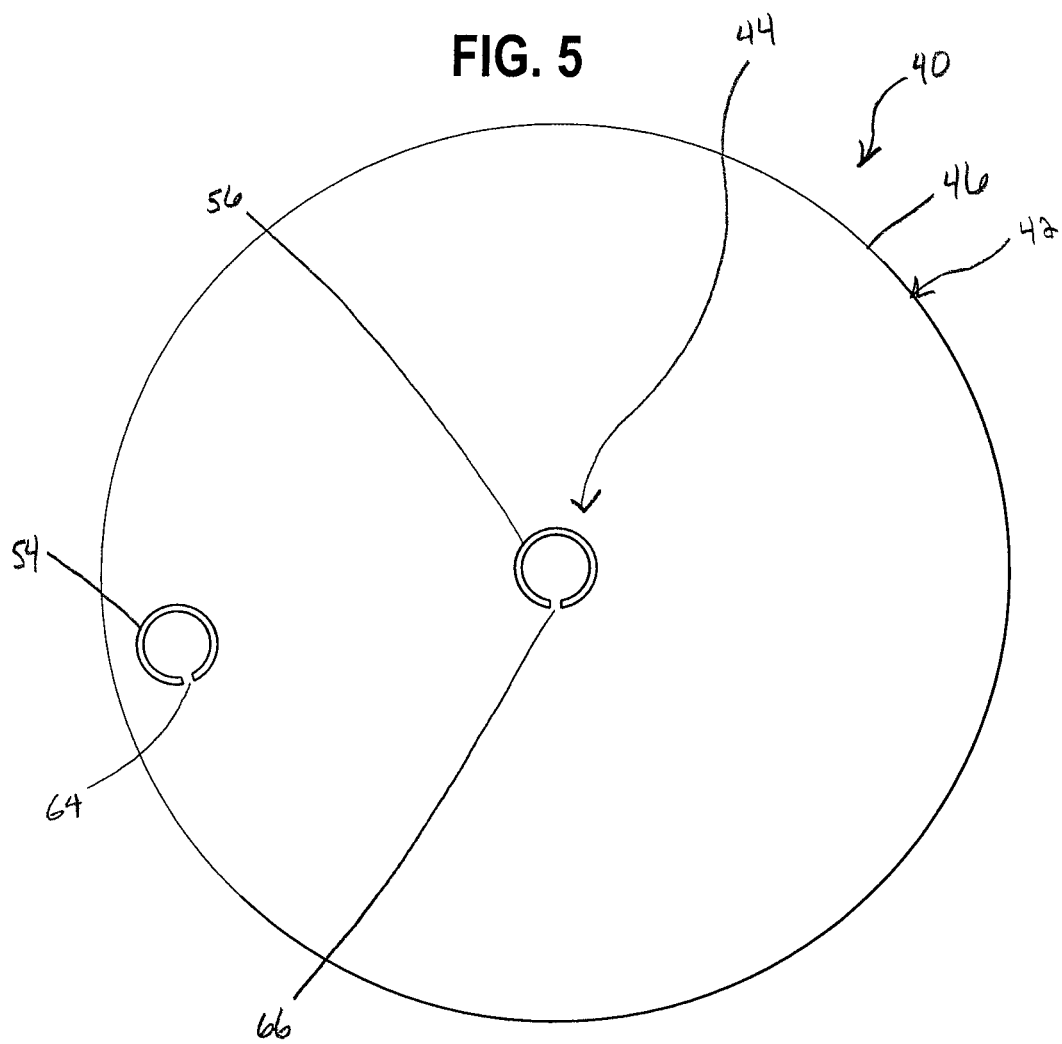
FIG. 5 is a top view of one form of a spiral flow system.

Referring to FIGS. 4-5, there is illustrated a fluid flow system, generally designated by the numeral 40. The system 40 includes a tank 42 having a generally centralized portion 44 and at least one sidewall 46. The sidewall 46 may be made up of a number of sidewall sections that are secured relative to one another. Further, the tank 42 extends from a lower portion 48 to an upper portion 50 to contain a fluid therein. The tank 42 also may include a bottom wall 52 and a roof or top wall (not shown). While illustrated as having a generally flat bottom wall 52, it should be understood that other forms of bottom walls are also contemplated, including conical, spherical and the like.

The system 40 further includes a first manifold 54 located adjacent the sidewall 46 and a second manifold 56 located at the centralized portion 44. The first manifold 54 includes a first length extending from the lower portion 48 to the upper portion 50 of the tank 42. Similarly, the second manifold 56 has a second length extending from the lower portion 48 to the upper portion 50. The first and second lengths need not extend the entire distance between the lower portion 48 and the upper portion 50. As shown in FIG. 4, in one form, the first manifold 54 and second manifold 56 include open top portions 60, 62.

Alternatively, the first manifold 54 and second manifold 56 may include closed top portions.

The first manifold 54 further includes a first opening 64 extending along at least a portion of the first length. The first opening 64 permits fluid to flow therethrough and into or out of the first manifold 54. Similarly, the second manifold 56 includes a second opening 66 extending along at least a portion of the second length. The second opening 66 permits fluid to flow therethrough and into or out of the second manifold 56. In one form, the first manifold 54 functions as an inlet manifold, whereby fluid is introduced into the tank 42 via the first manifold 54, and the second manifold 56 functions as an outlet manifold, whereby the fluid is removed from the tank 42 via the second manifold 56. Further, a plurality of first and second manifolds may be included in the system 40.

The manifolds 54,56 may be secured within the tank 42 in conventional manners as understood by those skilled in the art. For example, in one form, the manifolds 54,56 are secured at least at the bottom wall 52. In another form, the manifolds 54,56 are also secured to the roof. Additional support structures also may be included to secure the manifolds 54,56 against the pressure and fluid flowing in the tank 42.

The first manifold 54 and the second manifold 56 may take a variety of forms and shapes. In one form, as shown in FIG. 4, the first manifold 54 and the second manifold 56 are in the form of cylindrical tubes. The manifolds 54,56 also may have any of a variety of other cross-sectional shapes, including, but not limited to, oval shaped, wing shaped, other aerodynamic shapes and the like.

Figure 6:
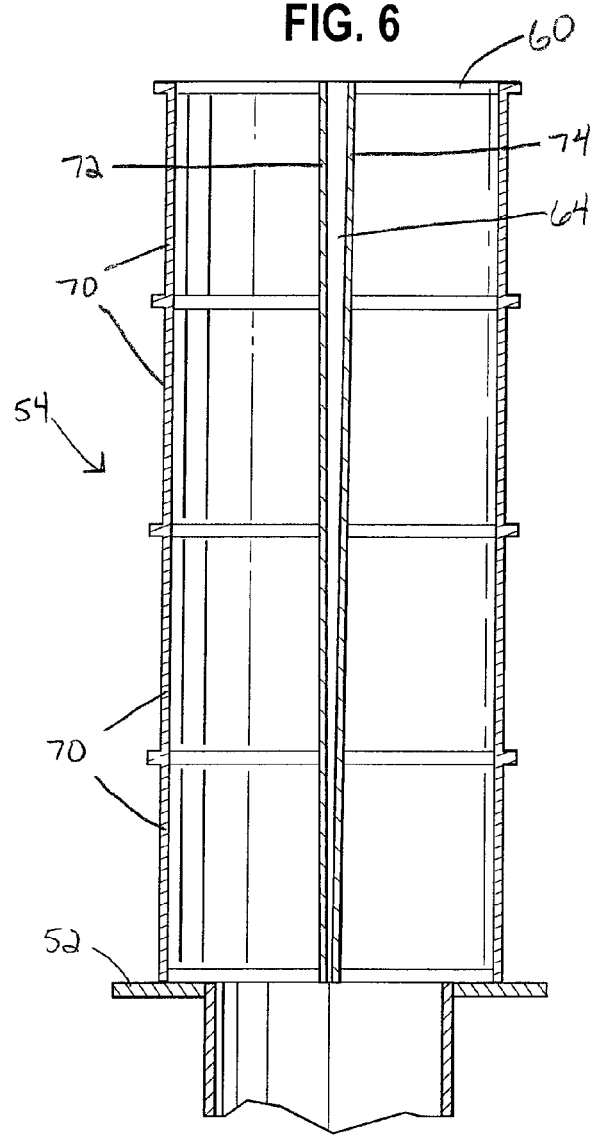
FIG. 6 is a cross-sectional view of one form of a manifold.

The first manifold 54 and the second manifold 56 may each be formed from a single unitary structure, such as a single pipe, or may be formed from a plurality of sections. As shown in FIG. 6, the first manifold 54 is illustrated as being formed from a plurality of pipe sections 70. In this regard, the pipe sections 70 may be affixed to one another in a conventional manner, such as by being welded together or secured together via flanges and fasteners. The second manifold 56 also may be configured in a similar manner as desired.

Additionally, the manifolds 54,56 may have a variety of different sizes. Further, the first manifold 54 and second manifold 56 need not be the same size. Moreover, while illustrated in FIG. 6 as having a generally constant diameter, the first manifold 54 may have a larger diameter near the lower portion 48 than near the upper portion 50 and vice versa. The second manifold 56 also may be configured in a similar manner as desired. Additionally, in one form, at least one of the first and second manifolds 54,56 is configured to be the same size as a connection pipe to the respective manifold.

The first opening 64 and the second opening 66 also may take a variety of forms and shapes. For example, at least one of the openings 64,66 may extend the entire length of the respective manifold 54,56 At least one of the openings 64,66 may be in the form of a slot.

Figure 7:
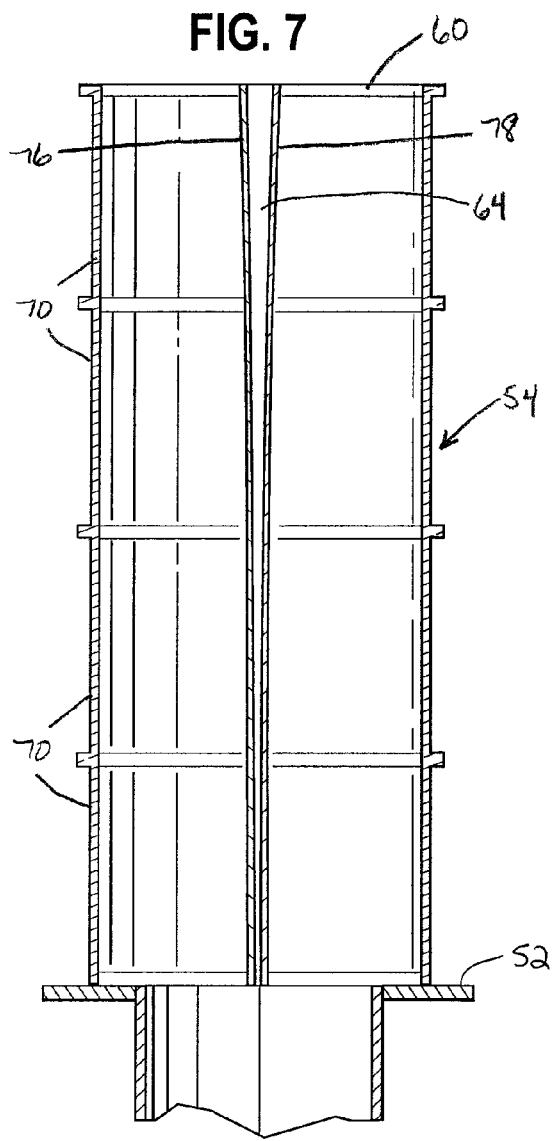
FIG. 7 is a cross-sectional view of another form of a manifold.

Alternatively, the openings 64,66 need not extend the entire length of the respective manifold 54,56. Further, in one form, at least one of the openings 64,66 is configured such that the width of the respective opening 64,66 is constant along the entire length of the opening 64,66, such as found in FIG. 4. In another form, the width of at least one of the openings 64,66 varies along the length. For example, in one form as shown in FIG. 6, the width of the first opening 54 becomes larger moving from the lower portion 48 towards the upper portion 50. In this form, the opening 64 is defined by surfaces 72,74 which linearly diverge, such as shown in FIG. 6. An alternative form of the opening 64 is illustrated in FIG. 7. In this form, the opening 64 is defined by surfaces 76,78 which still diverge, but do not diverge linearly along the length of the opening 64. Instead, the surfaces 76,78 increasingly diverge with an arcuate path along the length of the opening 64.

The widths of the openings 64,66 also may be modified in other ways. For example, the width of at least one of the openings 64,66 may be inverted, as compared to FIG. 6, such that the opening 64,66 is smaller near the upper portion 50 and increases along the length towards the lower portion 48 adjacent the bottom wall 52. Additionally, the width of at least one of the openings 64,66 also may vary along the length, such that the width is relatively small at locations near the lower portion 48 and upper portion 50, but relatively larger in an intermediate portion between the lower portion 48 and upper portion 50.

Figure 8:
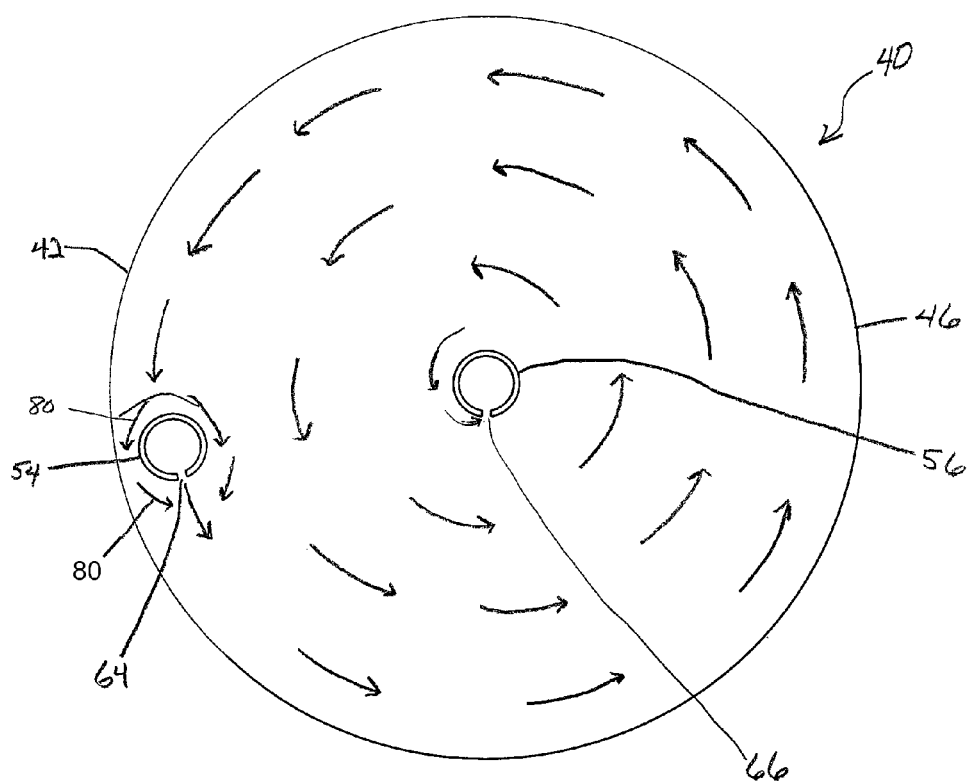
FIG. 8 is a top view of one form of a spiral flow system illustrating a fluid flow profile therein.

The manifolds 54,56 and openings 64,66 may be positioned and oriented as necessary to achieve the desired flow characteristics. As illustrated in FIG. 8, the first manifold 54 is functioning as an inlet manifold, while the second manifold 56 is functioning as an outlet manifold. Further, the first manifold 54 is positioned near the sidewall 46, but still permits fluid to flow between the sidewall 46 and the first manifold 54. Further, the first opening 64 is oriented such that fluid exiting the opening 64 is directed generally concentrically with the arc of the sidewall 46. As described previously, the openings 64,66 may extend along at least a portion of the length of the respective manifold 54,56. In this regard, fluid is directed into/out of the openings 64,66 such that the flow may have a generally elongated flow profile. In one form, this elongated flow profile may be considered a ribbon-type or spiral flow profile.

The fluid flows through the tank 42 generally as indicated by the arrows in FIG. 8. Further, as fluid impinges on the first manifold 54, the fluid flows around the manifold 54, as illustrated by arrows 80. The fluid continues to flow through the tank 42 in a generally spiral manner, finally exiting at the second manifold 56. In one form, the spiral flow pattern begins at the sidewall 46 of the tank 42 and continues in a decreasing arc to the centralized portion 44 of the tank 42. In one form, such a pattern could be described as a jelly roll pattern.

In one form, at least one of the openings 64,66 may be relatively small to create a higher inlet velocity to the tank 42. In this regard, the relatively narrow width of the openings 64,66 and higher exit velocity of the fluid results in more rotations within the tank 42 before exiting through the outlet. Such a form may result in minimizing turbulence between the concentric layers, and thus, the fluid flow proceeds through the tank 42 in a more orderly manner.

Further, in one form, where the first manifold 54 is functioning as the inlet manifold and is configured with the first opening 64 as shown in FIG. 6, the fluid may have a substantially uniform exit volume flow rate along the length of the manifold 54. The second manifold 56 and second opening 66 may be similarly arranged to achieve substantially uniform flow rates along the height of the second manifold 56. Such an arrangement may help provide a substantially uniform flow profile from the lower portion 48 to the upper portion 50 which may permit a more uniform spiral flow pattern.

As noted above, it is often desirable to maintain the fluid in the tank until disinfection has completed or a reaction takes place. In one form, one or more of the configurations discussed above may provide a relatively uniform spiral flow pattern which may reduce the tank volume needed to maintain fluid in the tank for a specified period. Such a system may be useful in tanks that store potable water following treatment to purify the water and/or in wastewater applications.

As described above, in one form, the manifolds 54,56 may be constructed in short sections or rings which may be easier to assemble in confined areas and may not require expensive machinery, such as cranes. Further, sectional manifolds may be built after the tank is completed, such as to retrofit the tank. Additionally, the manifolds do not need to be attached to the tank sidewall which may minimize additional forces on the tank sidewall and allow the tank designer greater freedom. As the manifolds are not attached to the sidewall, if the sidewall flexes as a result of the volume in the tank, the movement should not affect the manifolds. In one form, the spiral flow pattern has little force on the inlet baffle and virtually no force other than minor friction on the outlet baffle.

The components of the system 40 may be made from a variety of materials. For example, one or more of the tank 42, sidewall 46 and manifolds 54,56 may be made from various materials, including, but not limited to, steel, stainless steel, aluminum, fiberglass and the like. Further, one or more of the components may include anti-corrosion coatings or treatments. Other materials also may be utilized as understood by those skilled in the art.

One exemplary form of the system will be described and illustrated using velocity vector plots to show the flow pattern in one form of the system. The system of Example 1 includes the following features for a cylindrical tank described in Table 1.

TABLE 1

| | |
|---|---|
| Inlet pipe diameter | 6 ft. (having a centerline located at 4.5 ft. from the side wall and having a 7 ft. diameter manifold extending therefrom) |
| Outlet pipe diameter | 6 ft. (located at center of tank and having a 7 ft. diameter manifold extending therefrom) |
| Tank height and diameter | 55 ft. height, 100 ft. diameter |
| Inlet pipe opening (top) | 0.53 ft. (6.3 in.) |
| Inlet pipe opening (floor) | 0.208 ft. (2.496 in.) |
| Outlet pipe opening (top) | 0.61 ft. (7.32 in.) |
| Outlet pipe opening (floor) | 0.29 ft. (3.48 in.) |
| Water density | 62.4 lb/ft$^3$ |
| Flow rate | 6425.136 lb/sec. (43200 gal./min.) |

Figure 9:
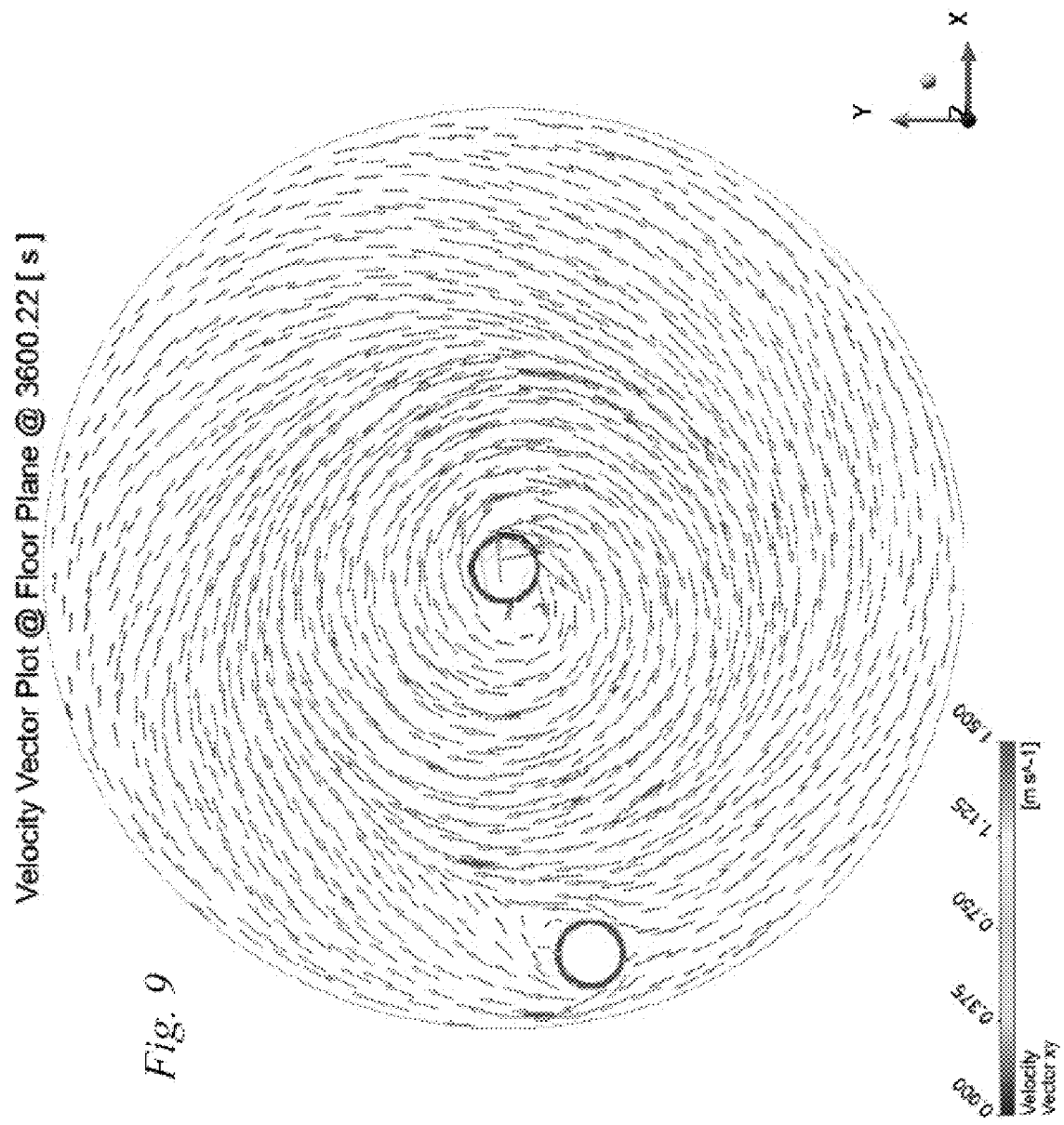
FIG. 9 is a velocity vector plot at the floor plane of one exemplary system.
Figure 10:
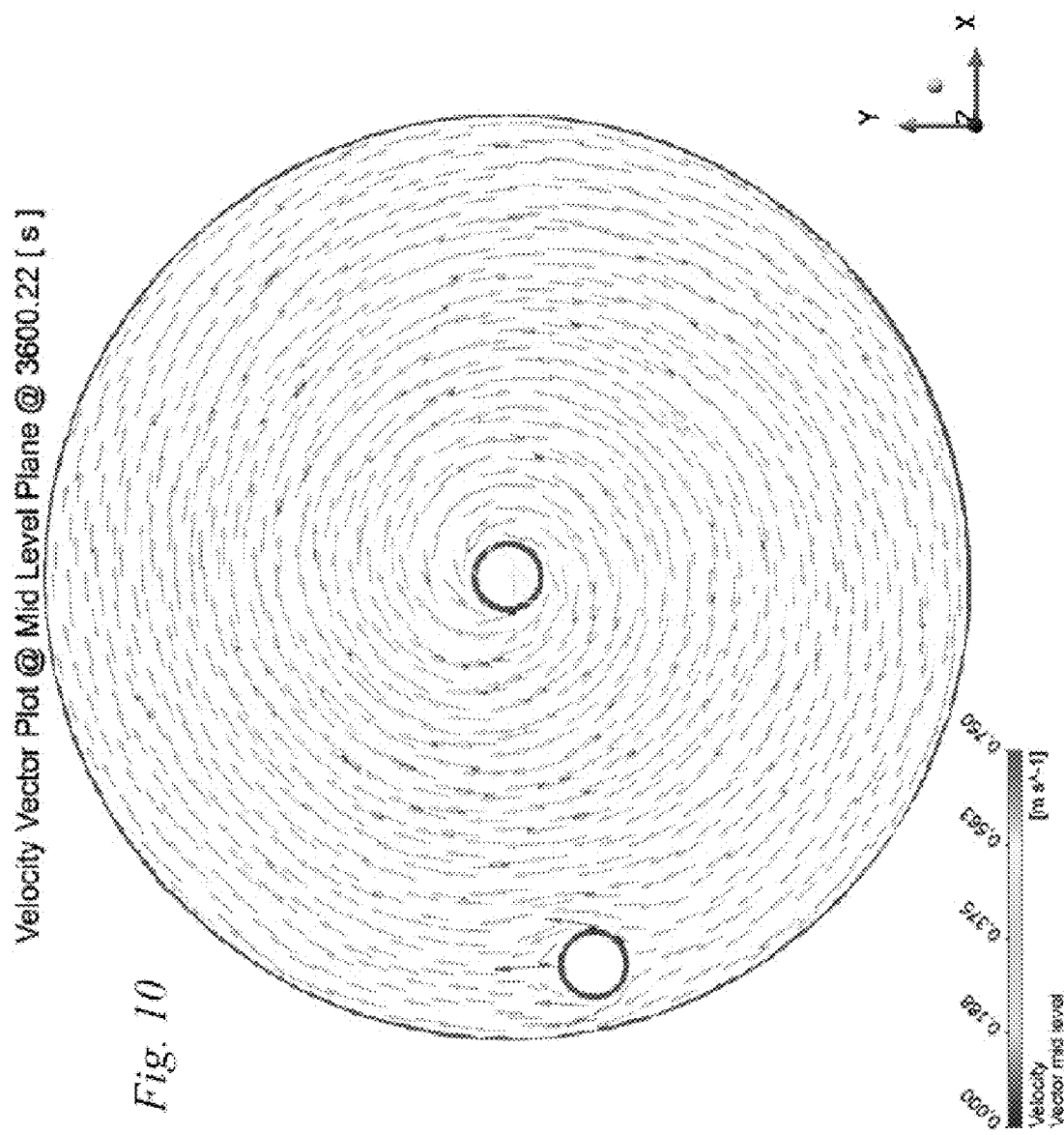
FIG. 10 is a velocity vector plot at the mid-level plane of one exemplary system.
Figure 11:
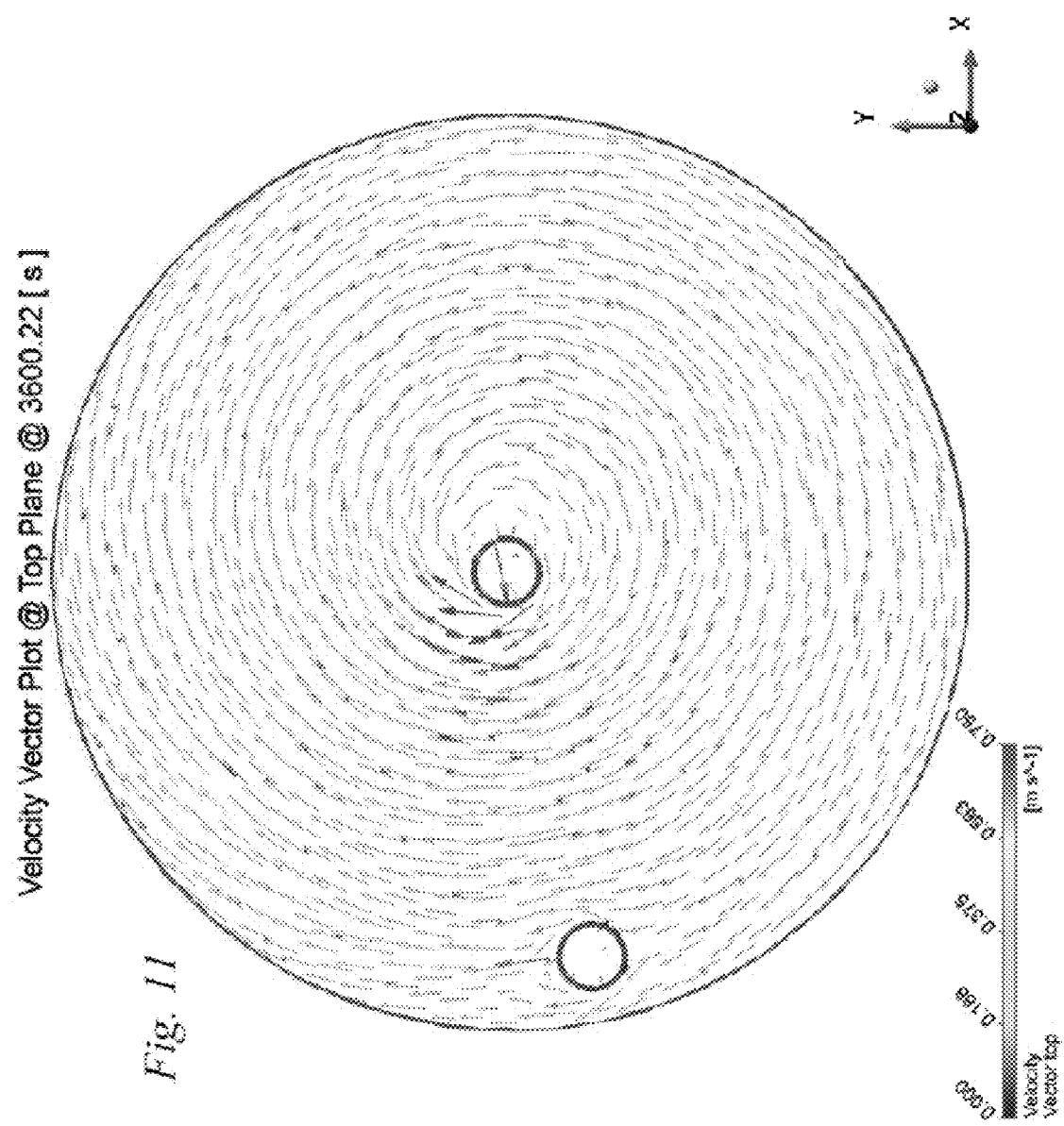
FIG. 11 is a velocity vector plot at the top plane of one exemplary system.

FIGS. 9-11 illustrate the velocity vector within the tank of Example 1 at the floor, mid-level and top of the tank, respectively, approximately 3600 seconds after start up. As shown in these figures, the fluid flow is generally uniform throughout the tank, with only minor variations near the floor plane. Further, it can be seen that the fluid flows around the manifold and between the manifold and the tank wall.

FIG. 12 illustrates the velocity streamline of fluid flowing through the tank of Example 1. As seen in this figure, the fluid flow is generally laminar throughout the tank. This generally laminar flow can be used to design a system to ensure a desired retention time within the tank. As the fluid flows in a generally uniform manner from the inlet to the outlet, the system can be designed to ensure that all of the fluid flowing through the tank achieves the desired retention time.

In one form, it is desirable to have the manifold adjacent the sidewall of the tank be within 24 inches of the sidewall of the tank to minimize disturbance on the pattern in the tank. In another form, it is desirable to have the manifold adjacent the sidewall of the tank be within 6 inches of the sidewall of the tank. It should be noted that with certain tanks, such as with tanks that have sidewalls which flex outwardly, the distance between the manifold and the sidewall may not be uniform along the height of the manifold.

The matter set forth in the foregoing description and accompanying drawings is offered by way of illustration only and not as a limitation. While particular embodiments have been shown and described, the actual scope of the protection sought is intended to be defined in the following claims.

What is claimed is:

1. A fluid flow system comprising:
  a tank having a generally centralized portion and a sidewall, the tank extending from a lower portion to an upper portion to contain fluid therein;
  a first manifold located adjacent the sidewall and having a first length extending from the lower portion toward the upper portion, the first manifold defining at least in part a first slot extending along at least a portion of the first length permitting fluid flow therethrough, the first manifold being positioned to permit fluid to flow between the first manifold and the sidewall independent of the first slot; and
  a second manifold located about the centralized portion and having a second length extending from the lower portion toward the upper portion, the second manifold defining a second slot extending along at least a portion of the second length permitting fluid flow therethrough.

2. The fluid flow system of claim 1 wherein the tank is a circular tank.

3. The fluid flow system of claim 1 wherein at least one of the first and second manifolds is a cylindrical tube construction.

4. The fluid flow system of claim 1 wherein at least one of the first and second manifolds comprises a plurality of sectional pieces that may be assembled together.

5. The fluid flow system of claim 1 wherein the first manifold is not connected to the sidewall.

6. The fluid flow system of claim 1 wherein the first manifold is supported from a top portion of the tank.

7. The fluid flow system of claim 1 wherein at least one of the first and second slots has a generally V-shaped configuration.

8. The fluid flow system of claim 7 wherein the V-shaped configuration is linear.

9. The fluid flow system of claim 7 wherein the V-shaped configuration is arcuate.

10. A fluid flow system comprising:
  a tank having a generally centralized portion and a sidewall, the tank extending from a lower portion to an upper portion to contain fluid therein;
  a first manifold located adjacent the sidewall and having a first length extending from the lower portion to the upper portion, the first manifold defining at least in part a first slot extending along at least a portion of the first length permitting fluid flow therethrough, the first slot having a varying width therealong such that the width of the first slot adjacent the lower portion is smaller than the width of the first slot adjacent the upper portion; and
  a second manifold located about the centralized portion and having a second length extending from the lower portion to the upper portion, the second manifold defining a second slot extending along at least a portion of the second length permitting fluid flow therethrough.

11. The fluid flow system of claim 10 wherein the tank is a circular tank.

12. The fluid flow system of claim 10 wherein at least one of the first and second manifolds is a cylindrical tube construction.

13. The fluid flow system of claim 10 wherein at least one of the first and second manifolds comprises a plurality of sectional pieces that may be assembled together.

14. The fluid flow system of claim 10 wherein the first manifold is not connected to the sidewall.

15. The fluid flow system of claim 10 wherein the first manifold is supported from a top portion of the tank.

16. The fluid flow system of claim 10 wherein at least one of the first and second slots has a generally V-shaped configuration.

17. The fluid flow system of claim 10 wherein the second slot has a varying width along the second length such that the width of the second slot adjacent the lower portion is smaller than the width of the second slot adjacent the upper portion.

18. A method of flowing fluid through a tank having a generally centralized portion and a sidewall, the tank extending from a lower portion to an upper portion to contain fluid therein, the method comprising the steps of:

provifing a first manifold located adjacent the sidewall and having a first length extending from the lower portion to the upper portion, the first manifold defining at least in part a first slot extending along at least a portion the first length;

flowing fluid through the first slot to provide an elongated flow pattern from the first slot;

flowing fluid past the first manifold and between the first manifold and the sidewall to provide a generally spiral flow pattern in the tank; and outputting fluid through a second manifold located about the centralized portion.

19. The method of claim 18 wherein at least one of the step of providing the first manifold includes providing the first manifold in a plurality of sections that may be assembled together.

20. The method of claim 18 wherein the first opening is a generally V-shaped slot to provide the generally vertical, rectangular flow pattern.

\* \* \* \* \*

UNITED STATES PATENT AND TRADEMARK OFFICE
CERTIFICATE OF CORRECTION

| | | |
|---|---|---|
| PATENT NO. | : 8,887,765 B2 | Page 1 of 1 |
| APPLICATION NO. | : 13/325853 | |
| DATED | : November 18, 2014 | |
| INVENTOR(S) | : J. Mark Crump | |

It is certified that error appears in the above-identified patent and that said Letters Patent is hereby corrected as shown below:

IN THE CLAIMS

Column 8, line 15, in claim 20, delete "opening" and insert --slot-- therefor.

Signed and Sealed this
Seventh Day of April, 2015

Michelle K. Lee
*Director of the United States Patent and Trademark Office*